US011673317B2

(12) United States Patent
Kugel et al.

(10) Patent No.: US 11,673,317 B2
(45) Date of Patent: Jun. 13, 2023

(54) CORE-SHEATH FILAMENTS AND METHODS OF PRINTING AN ADHESIVE

(71) Applicant: 3M INNOVATIVE PROPERTIES COMPANY, St. Paul, MN (US)

(72) Inventors: Alexander J. Kugel, Woodbury, MN (US); Shantanu R. Ranade, Woodbury, MN (US); Mark E. Napierala, St. Paul, MN (US); Thomas Q. Chastek, St. Paul, MN (US); Shaun M. West, St. Paul, MN (US); Jacob D. Young, St. Paul, MN (US); Ross E. Behling, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/631,054

(22) PCT Filed: Aug. 5, 2020

(86) PCT No.: PCT/IB2020/057407
§ 371 (c)(1),
(2) Date: Jan. 28, 2022

(87) PCT Pub. No.: WO2021/024204
PCT Pub. Date: Feb. 11, 2021

(65) Prior Publication Data
US 2022/0281159 A1 Sep. 8, 2022

Related U.S. Application Data

(60) Provisional application No. 62/884,038, filed on Aug. 7, 2019.

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *B33Y 70/00* (2014.12); *C09J 5/02* (2013.01);
(Continued)

(58) Field of Classification Search
CPC ........ C09J 133/00–26; C09J 7/35; C09J 5/02; B29C 64/119; B29C 64/118; B33Y 10/00; B33Y 70/00
See application file for complete search history.

(56) References Cited

U.S. PATENT DOCUMENTS 3,469,363 A  9/1969  Berckmoes
3,625,875 A  12/1971 Elliott
(Continued)

FOREIGN PATENT DOCUMENTS

DE   10259457   12/2004
EP   0051365    12/1982
(Continued)

OTHER PUBLICATIONS

Satas, "Handbook of Pressure-Sensitive Adhesive Technology", Van Nostrand Reinhold, 1989, Ed.02., pp. 172.
(Continued)

*Primary Examiner* — Kregg T Brooks

(57) ABSTRACT

A core-sheath filament having a non-tacky sheath and a hot-melt processable adhesive core, the sheath exhibiting a melt flow index of less than 15 grams per 10 minutes, is provided. Methods of making the core-sheath filament and methods of using the core-sheath filament to print a hot-melt processable adhesive onto a primer-treated substrate surface to provide a structural bond are described.

10 Claims, 1 Drawing Sheet

(51) Int. Cl.
  *B33Y 70/00* (2020.01)
  *C09J 123/06* (2006.01)
  *C09J 133/08* (2006.01)
  *C09J 7/35* (2018.01)
  *C09J 5/02* (2006.01)
  *B29K 23/00* (2006.01)
  *B29K 33/00* (2006.01)

(52) U.S. Cl.
  CPC .............. *C09J 7/35* (2018.01); *C09J 123/06* (2013.01); *C09J 133/08* (2013.01); *B29K 2023/0633* (2013.01); *B29K 2033/08* (2013.01)

(56) References Cited

U.S. PATENT DOCUMENTS

| | | |
|---|---|---|
| 3,639,500 A | 2/1972 | Muny |
| 3,995,308 A | 11/1976 | Weinstein |
| 4,170,612 A | 10/1979 | Pastor |
| 4,316,000 A | 2/1982 | Boeder |
| 4,373,077 A | 2/1983 | Boeder |
| 4,452,955 A | 6/1984 | Boeder |
| 4,472,231 A | 9/1984 | Jenkins |
| 4,490,424 A | 12/1984 | Gerace |
| 4,569,976 A | 2/1986 | Zimmerman |
| 4,945,006 A | 7/1990 | Muggee |
| 4,946,529 A | 8/1990 | Huddleston |
| 5,003,016 A | 3/1991 | Boeder |
| 5,106,808 A | 4/1992 | Boeder |
| 5,322,731 A | 6/1994 | Callahan, Jr. |
| 5,387,623 A | 2/1995 | Ryan |
| 5,669,207 A | 9/1997 | Hull |
| 5,804,610 A | 9/1998 | Hamer |
| 6,138,441 A | 10/2000 | Kik |
| 6,734,249 B1 | 5/2004 | Bulluck |
| 7,328,547 B2 | 2/2008 | Mehta |
| 7,773,834 B2 | 8/2010 | Ouderkirk |
| 8,735,506 B2 | 5/2014 | Hammond |
| 9,102,774 B2 | 8/2015 | Clapper |
| 9,181,457 B2 | 11/2015 | Attarwala |
| 9,193,110 B2 | 11/2015 | Pridoehl |
| 9,475,968 B2 | 10/2016 | Hammond |
| 9,878,515 B2 | 1/2018 | Remmers |
| 2004/0228998 A1 | 11/2004 | Haas |
| 2005/0214497 A1 | 9/2005 | Bilodeau |
| 2005/0230960 A1 | 10/2005 | Bilodeau |
| 2008/0242764 A1 | 10/2008 | Wallace |
| 2008/0295959 A1 | 12/2008 | Ishigaki |
| 2009/0286950 A1 | 11/2009 | Schumann |
| 2010/0061823 A1 | 3/2010 | Attarwala |
| 2010/0255239 A1 | 10/2010 | Hammond |
| 2012/0083570 A1* | 4/2012 | Satrijo .................. C09J 133/02 524/561 |
| 2013/0052460 A1 | 2/2013 | Iseki |
| 2013/0184394 A1 | 7/2013 | Satrijo |
| 2014/0011912 A1 | 1/2014 | Petry |
| 2015/0210894 A1 | 7/2015 | Malofsky |
| 2016/0289513 A1 | 10/2016 | Behling |
| 2017/0088715 A1 | 3/2017 | Malofsky |
| 2018/0029970 A1 | 2/2018 | Benson |
| 2018/0162013 A1 | 6/2018 | Fulop |
| 2018/0215959 A1 | 8/2018 | Liu |
| 2019/0144715 A1 | 5/2019 | Iwase |
| 2020/0362204 A1* | 11/2020 | Ranade ................. C09D 183/02 |
| 2021/0002793 A1* | 1/2021 | Nyaribo ................. C09J 7/385 |

FOREIGN PATENT DOCUMENTS

| | | |
|---|---|---|
| EP | 0140006 | 5/1985 |
| EP | 232936 | 8/1987 |
| EP | 889105 | 1/1999 |
| GB | 1448257 | 9/1976 |
| JP | 60026079 | 2/1985 |
| JP | 09111193 | 4/1997 |
| WO | WO 2011-145620 | 11/2011 |
| WO | WO 2014-078115 | 5/2014 |
| WO | WO 2016-090164 | 6/2016 |
| WO | WO 2021-024204 | 2/2021 |
| WO | WO 2021-028795 | 2/2021 |
| WO | WO 2021-028821 | 2/2021 |
| WO | WO 2021-033064 | 2/2021 |
| WO | WO 2021-033084 | 2/2021 |
| WO | WO 2021-033138 | 2/2021 |
| WO | WO 2021-130619 | 7/2021 |
| WO | WO 2021-130620 | 7/2021 |
| WO | WO 2021-198828 | 10/2021 |
| WO | WO 2021-198829 | 10/2021 |

OTHER PUBLICATIONS

Turner, "A review of melt extrusion additive manufacturing processes: I. process design and modeling"; Rapid Prototyping Journal, (2014), vol. 20, No. 3, pp. 192-204.

International Search report for PCT International Application No. PCT/IB2020/057407 dated Nov. 10, 2020, 5 pages.

* cited by examiner

CORE-SHEATH FILAMENTS AND METHODS OF PRINTING AN ADHESIVE

CROSS REFERENCE TO RELATED APPLICATIONS

This application is a national stage filing under 35 U.S.C. § 371 of PCT/IB2020/057407, filed Aug. 5, 2020, which claims the benefit of Provisional Application No. 62/884,038, filed Aug. 7, 2019, the disclosure of which is incorporated by reference in its/their entirety herein.

TECHNICAL FIELD

The present disclosure broadly relates to core-sheath filaments including adhesive cores and non-tacky sheaths.

BACKGROUND

The use of fused filament fabrication ("FFF") to produce three-dimensional articles has been known for a relatively long time, and these processes are generally known as methods of so-called 3D printing (or additive manufacturing). In FFF, a plastic filament is melted in a moving printhead to form a printed article in a layer-by-layer, additive manner. The filaments are often composed of polylactic acid, nylon, polyethylene terephthalate (typically glycol-modified), or acrylonitrile butadiene styrene.

SUMMARY

Provided herein are adhesive systems including pressure-sensitive adhesives ("PSA") that are hot-melt processable. The hot-melt processable adhesives are in a filament core/sheath form factor having a core and a non-tacky sheath such that the hot-melt processable adhesives can be post-cured using surface activation on a substrate with a liquid activator to provide a structural adhesive.

In one aspect, provided is an adhesive system comprising:
I) core-sheath filament comprising:
  a non-tacky sheath, wherein the sheath exhibits a melt flow index of less than 15 grams per 10 minutes; and
  a hot-melt processable adhesive core, wherein the hot-melt processable adhesive core comprises a blend of:
    a hot-melt processable adhesive;
    a transition metal compound;
    an accelerator; and
    a curable component; and
II) a primer for adhesion of the core-sheath filament to a substrate comprising:
    an oxidizing agent,
wherein the primer is a liquid at normal temperature and pressure.

In another aspect, provided is a method of making a core-sheath filament, the method comprising:
a) forming a core composition that is hot-melt processable adhesive comprising
  1) 33 to 94.8 weight percent of a random copolymer based on a total weight of the core, the random copolymer comprising an acrylate monomer;
  2) 0.0002 to 2 weight percent of a transition metal compound based on the total weight of the core;
  3) 0.1 to 5 weight percent of an accelerator based on the total weight of the core;
  4) 5 to 60 weight percent of a curable composition based on the total weight of the core;

b) forming a sheath composition comprising a non-tacky thermoplastic material; and
c) wrapping the sheath composition around the core composition the core-sheath filament, wherein the core-sheath filament has an average longest cross-sectional distance in a range of 1 to 20 millimeters.

The preceding summary of the present disclosure is not intended to describe each embodiment of the present invention. The details of one or more embodiments of the invention are also set forth in the description below. Other features, objects, and advantages of the invention will be apparent from the description and from the claims.

As used herein:

"hot-melt processable adhesive" means an adhesive comprising little or no conventional solvent (which is various embodiments may be less than 5 wt %, less than 3 wt %, less than 1 wt %, less than 0.5 wt %, less than 0.1 wt %, or less than 0.01 wt % of conventional solvent), which may be hot-melt processed under conventional conditions, where hot-melt process includes hot-melt blending and extruding;

"(meth)acrylate" includes, separately and collectively, methacrylate and acrylate;

"monomer unit" of a polymer or oligomer is a segment of a polymer or oligomer derived from a single monomer;

"normal temperature and pressure" or "NTP" means a temperature of 20° C. (293.15 K, 68° F.) and an absolute pressure of 1 atm (14.696 psi, 101.325 kPa);

"pressure-sensitive adhesive" or "PSA" refers to a viscoelastic material that possesses the following properties: (1) aggressive and permanent tack, (2) adherence to a substrate other than a fluorothermoplastic film with no more than finger pressure, and (3) sufficient cohesive strength to cleanly release from the substrate. A pressure-sensitive adhesive may also meet the Dahlquist criterion described in Handbook of Pressure-Sensitive Adhesive Technology, D. Satas, $2^{nd}$ ed., page 172 (1989). This criterion defines a pressure-sensitive adhesive as one having a one-second creep compliance of greater than $1\times10^{-6}$ cm$^2$/dyne at its use temperature (for example, at temperatures in a range of from 15° C. to 35° C.);

"structural adhesive" means an adhesive that binds by irreversible cure, typically with a strength when bound to its intended substrates, measured as stress at break (i.e., average peak stress) using the overlap shear test described in the Examples herein, of at least 500 kPa (73 psi), in some embodiments at least 560 kPa (81 psi), in some embodiments at least 2,190 kPa (318 psi), and in some embodiments at least 3,020 kPa (439 psi).

All scientific and technical terms used herein have meanings commonly used in the art unless otherwise specified.

As used in this specification and the appended claims, terms such as "coated" and "embossed" are intended to represent structure, and not to limit the process used to obtain the recited structure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Features and advantages of the present disclosure will be further understood upon consideration of the detailed description as well as the appended claims.

Figure 1:
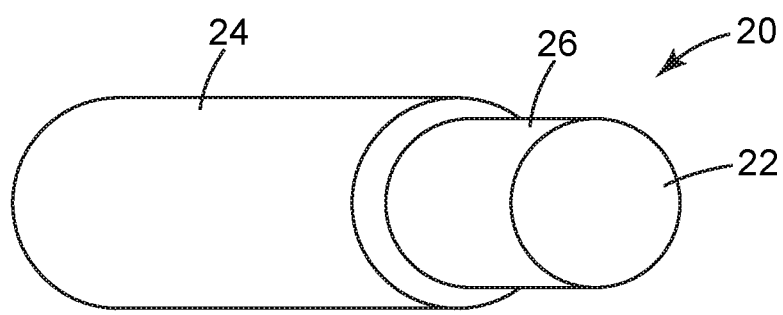
FIG. 1 is a schematic perspective exploded view of a section of a core-sheath filament, according to an embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Adhesive transfer tapes have been used extensively for adhering a first substrate to a second substrate. Adhesive transfer tapes are typically provided in rolls and contain a pressure-sensitive adhesive layer positioned on a release liner or between two release liners, and because transfer adhesive tapes often need to be die-cut to the desired size and shape prior to application to a substrate, the transfer adhesive tape that is outside the die-cut area is discarded as waste. The core-sheath filaments described herein can be used to deliver a pressure-sensitive adhesive (also referred to herein as a "hot-melt processable adhesive") without the use of a release liner and with less waste. The non-tacky sheath allows for easy handling of the hot-melt processable adhesive before deposition on a substrate. Furthermore, the use of the core-sheath filaments described herein as the adhesive composition can substantially reduce the waste often associated with adhesive transfer tapes as no die-cutting is required because the adhesive is deposited only in the desired area.

The disclosed core-sheath filaments can be used for printing a hot-melt processable adhesive using fused filament fabrication ("FFF"). The material properties needed for FFF dispensing typically are significantly different than those required for hot-melt dispensing of a pressure-sensitive adhesive composition. For instance, in the case of traditional hot-melt adhesive dispensing, the adhesive is melted into a liquid inside a tank and pumped out through a hose and nozzle. Thus, traditional hot-melt adhesive dispensing requires a low-melt viscosity adhesive, which is often quantified as a high melt flow index ("MFI") adhesive. If the viscosity is too high (or the MFI is too low), the hot-melt adhesive cannot be effectively transported from the tank to the nozzle. In contrast, FFF involves melting a filament only within a nozzle at the point of dispensing, and therefore is not limited to low melt viscosity adhesives (high melt flow index adhesives) that can be easily pumped. In fact, a high melt viscosity adhesive (a low melt flow index adhesive) can advantageously provide geometric stability of a hot-melt processable adhesive after dispensing, which allows for precise and controlled placement of the adhesive as the adhesive does not spread excessively after being printed.

In addition, suitable filaments for FFF typically need at least a certain minimum tensile strength so that large spools of filament can be continuously fed to a nozzle without breaking. The FFF filaments are usually spooled into level wound rolls. When filaments are spooled into level wound rolls, the material nearest the center can be subjected to high compressive forces. Preferably, the core-sheath filament is resistant to permanent cross-sectional deformation (i.e., compression set) and self-adhesion (i.e., blocking during storage).

Provided herein are adhesive systems including pressure-sensitive adhesives ("PSA") that are hot-melt processable, i.e., hot-melt processable adhesives. The hot-melt processable adhesives are in a filament core/sheath form factor having a core and a non-tacky sheath such that the hot-melt processable adhesives can be post-cured using surface activation on a substrate (e.g., a metal, a glass, a plastic) with a liquid activator to provide a structural adhesive. Delivery of the hot-melt processable adhesives can be completed via hotmelt dispense including techniques used in filament-based additive manufacturing. Because the liquid activator is applied separately to the substrate, before deposition of the hot-melt processable adhesive, the disclosed adhesive systems advantageously allow for flexibility in the choice of primer for use on different surfaces, as some primers may be better suited for use with some substrates than with others.

The disclosed core-sheath filaments include a core that is encapsulated by a sheath that prevents the wound filament from sticking to itself, enables easy unwind during additive manufacturing and other dispensing, and provides structural integrity such that the core-sheath filaments can be advanced to a heated extruder nozzle by mechanical means. Typically, the sheath is thin, has a composition such that it melts and mixes homogenously with the hot-melt processable adhesive core at the printer/extruder nozzle before application onto substrates, and has no surface tackiness at normal storage conditions. Through post-cure mechanisms, the disclosed hot-melt processable adhesive cores can be chemically modified so that they achieve a different state of performance (e.g., from soft, tacky compliant to a more stiff, higher shear performance) and/or an entire level of performance (e.g., PSA performance to structural adhesive performance).

Core-Sheath Filaments

Figure 2:
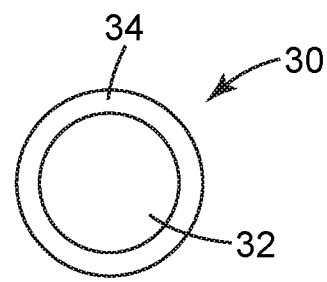
FIG. 2 is a schematic cross-sectional view of a core-sheath filament, according to an embodiment of the present disclosure.

An example core-sheath filament 20 is shown schematically in FIG. 1. The filament includes a core 22 and a sheath 24 surrounding (encasing) the outer surface 26 of the core 22. FIG. 2 shows the core-sheath filament 30 in a cross-sectional view. The core 32 is surrounded by the sheath 34. Any desired cross-sectional shape can be used for the core. For example, the cross-sectional shape can be a circle, oval, square, rectangular, triangular, or the like. The cross-sectional area of the core 32 is typically larger than the cross-sectional area of the sheath 34.

The core-sheath filament usually has a relatively narrow longest cross-sectional distance (e.g., diameter for cores that have a circular cross-sectional shape) so that it can use used in applications where precise deposition of an adhesive is needed or advantageous. For instance, the core-sheath filament usually has an average longest cross-sectional distance in a range of 1 to 20 millimeters (mm). The average longest cross-sectional distance of the filament can be at least 1 mm, at least 2 mm, at least 3 mm, at least 4 mm, at least 5 mm, at least 6 mm, at least 8 mm, or at least 10 mm and can be up to 20 mm, up to 18 mm, up to 15 mm, up to 12 mm, up to 10 mm, up to 8 mm, up to 6 mm, or up to 5 mm. This average length can be, for example, in a range of 2 to 20 mm, 5 to 15 mm, or 8 to 12 mm.

Often, 1 to 10 percent of the longest cross-sectional distance (e.g., diameter) of the core-sheath filament is the sheath and 90 to 99 percent of the longest cross-sectional distance (e.g., diameter) of the core-sheath filament is the core. For example, up to 10 percent, up to 8 percent, up to 6 percent, or up to 4 percent and at least 1 percent, at least 2 percent, or at least 3 percent of the longest cross-sectional distance can be due to the sheath with the remainder being attributable to the core. The sheath extends completely around the core to prevent the core from sticking to itself. In some embodiments, however, the ends of the filament may contain only the core.

Often, the core-sheath filament has an aspect ratio of length to longest cross-sectional distance (e.g., diameter) of 50:1 or greater, 100:1 or greater, or 250:1 or greater. Core-sheath filaments having a length of at least about 20 feet (6 meters) can be useful for printing a hot-melt processable adhesive. Depending on the application or use of the core-sheath filament, having a relatively consistent longest cross-sectional distance (e.g., diameter) over its length can be desirable. For instance, an operator might calculate the amount of material being melted and dispensed based on the expected mass of filament per predetermined length; but if the mass per length varies widely, the amount of material dispensed may not match the calculated amount. In some embodiments, the core-sheath filament has a maximum variation of longest cross-sectional distance (e.g., diameter) of 20 percent over a length of 50 centimeters (cm), or even a maximum variation in longest cross-sectional distance (e.g., diameter) of 15 percent over a length of 50 cm.

Core-sheath filaments described herein can exhibit a variety of desirable properties, both as prepared and as a hot-melt processable adhesive composition. As formed, a core-sheath filament desirably has strength consistent with being handled without fracturing or tearing of the sheath. The structural integrity needed for the core-sheath filament varies according to the specific application of use. Preferably, a core-sheath filament has strength consistent with the requirements and parameters of one or more additive manufacturing devices (e.g., 3D printing systems). One additive manufacturing apparatus, however, could subject the core-sheath filament to a greater force when feeding the filament to a deposition nozzle than a different apparatus.

Advantageously, the elongation at break of the sheath material of the core-sheath filament is typically 50 percent or greater, 60 percent or greater, 80 percent or greater, 100 percent or greater, 250 percent or greater, 400 percent or greater, 750 percent or greater, 1000 percent or greater, 1400 percent or greater, or 1750 percent or greater and 2000 percent or less, 1500 percent or less, 900 percent or less, 500 percent or less, or 200 percent or less. Stated another way, the elongation at break of the sheath material of the core-sheath filament can range from 50 percent to 2000 percent. In some embodiments, the elongation at break is at least 60 percent, at least 80 percent, or at least 100 percent. Elongation at break can be measured, for example, by the methods outlined in ASTM D638-14, using test specimen Type IV.

Advantages provided by at least certain embodiments of employing the core-sheath filament as a pressure-sensitive adhesive once it is melted and mixed include one or more of: low volatile organic compound ("VOC") characteristics, avoiding die cutting, design flexibility, achieving intricate non-planar bonding patterns, printing on thin and/or delicate substrates, and printing on an irregular and/or complex topography.

Any suitable method known to those of skill in the relevant arts can be used to prepare the core-sheath filaments. Most methods include forming a core composition that is a hot-melt processable adhesive. The hot-melt processable adhesive in the core contains 1) 33 to 94.8 weight percent of a hot-melt processable adhesive; 2) 0.0002 to 2 weight percent of a transition metal compound; 3) 0.1 to 5 weight percent of an accelerator; and 4) 5 to 60 weight percent of a curable composition based on a total weight of the core. These methods further include forming a sheath composition comprising a non-tacky thermoplastic material. These methods still further include wrapping the sheath composition around the core composition.

In many embodiments, the method of making the core-sheath filament includes co-extruding the core composition and the sheath composition through a coaxial die such that the sheath composition surrounds the core composition. Optional additives for the core composition, which is a hot-melt processable adhesive, can be added in an extruder (e.g., a twin-screw extruder) equipped with a side stuffer that allows for the inclusion of additives. Similarly, optional additives can be added to a sheath composition in the extruder. The hot-melt processable adhesive core can be extruded through the center portion of a coaxial die having an appropriate longest cross-sectional distance (i.e., diameter) while the non-tacky sheath can be extruded through the outer portion of the coaxial die. One suitable die is a filament spinning die as described in U.S. Pat. No. 7,773,834 (Ouderkirk et al.). Optionally, the filament can be cooled upon extrusion using a water bath. The filament can be lengthened using a belt puller. The speed of the belt puller can be adjusted to achieve a desired filament cross-sectional distance (e.g., diameter).

In other embodiments, the core can be formed by extrusion of the core composition. The resulting core can be rolled within a sheath composition having a size sufficient to surround the core. In still other embodiments, the core composition can be formed as a sheet. A stack of the sheets can be formed having a thickness suitable for the filament. A sheath composition can be positioned around the stack such that the sheath composition surrounds the stack.

Suitable components of the core-sheath filament are described in detail below.

Sheath

The sheath provides structural integrity to the core-sheath filament, as well as separating the adhesive core so that it does not adhere to itself (such as when the filament is provided in the form of a spool or roll) or so that is does not prematurely adhere to another surface. The sheath it typically selected to be thick enough to support the filament form factor and to allow for delivery of the core-sheath filament to a deposition location. On the other hand, the thickness of the sheath is selected so that its presence does not adversely affect the overall adhesive performance of the core-sheath filament.

The sheath material is typically selected to have a melt flow index ("MFI") that is less than or equal to 15 grams/10 minutes when measured in accord with ASTM D1238 at 190° C. and a load of 2.16 kilograms. Such a low melt flow index is indicative of a sheath material that has sufficient strength (robustness) to allow the core-sheath filament to withstand the physical manipulation required for handling such as for use with an additive manufacturing apparatus. During such processes, the core-sheath filament often needs to be unwound from a spool, introduced into the additive manufacturing apparatus, and then advanced into a nozzle for melting and blending without breaking. Compared to sheath materials with a higher melt flow index, the sheath materials with a melt flow index that is less than or equal to 15 grams/10 minutes are less prone to breakage (tensile stress fracture) and can be wound into a spool or roll having a relatively small radius of curvature. In certain embodiments, the sheath material exhibits a melt flow index of 14 grams/10 minutes or less, 13 grams/10 minutes or less, 11 grams/10 minutes or less, 10 grams/10 minutes or less, 8 grams/10 minutes or less, 7 grams/10 minutes or less, 6 grams/10 minutes or less, 5 grams/10 minutes or less, 4 grams/10 minutes or less, 3 grams/10 minutes or less, 2 grams/10 minutes or less, or 1 grams/10 minutes or less. If desired, various sheath materials can be blended (e.g., melted and blended) together to provide a sheath composition having the desired melt flow index.

Low melt flow index values tend to correlate with high melt viscosities and high molecular weight. Higher molecular weight sheath materials tend to result in better mechanical performance. That is, the sheath materials tend to be more robust (i.e., the sheath materials are tougher and less likely to undergo tensile stress fracture). This increased robustness is often the result of increased levels of polymer chain entanglements. The higher molecular weight sheath materials are often advantageous for additional reasons. For example, these sheath materials tend to migrate less to adhesive/substrate interface in the final article; such migration can adversely affect the adhesive performance, especially under aging conditions. In some cases, however, block copolymers with relatively low molecular weights can behave like high molecular weight materials due to physical crosslinks. That is, the block copolymers can have low MFI values and good toughness despite their relatively low molecular weights.

As the melt flow index is lowered (such as to less than or equal to 15 grams/10 minutes), less sheath material is required to obtain the desired mechanical strength. That is, the thickness of the sheath layer can be decreased and its contribution to the overall longest cross-sectional distance (e.g., diameter) of the core-sheath filament can be reduced. This is advantageous because the sheath material may adversely impact the adhesive properties of the core pressure-sensitive adhesive if it is present in an amount greater than about 10 weight percent of the total weight of the filament.

For application to a substrate, the core-sheath filament is typically melted and mixed together before deposition on the substrate. The sheath material desirably is blended with the hot-melt processable adhesive in the core without adversely impacting the performance of the hot-melt processable adhesive. To blend the two compositions effectively, it is often desirable that the sheath composition is compatible with the core composition.

If the core-sheath filament is formed by co-extrusion of the core composition and the sheath composition, the melt viscosity of the sheath composition is desirably selected to be fairly similar to that of the core composition. If the melt viscosities are not sufficiently similar (such as if the melt viscosity of the core composition is significantly lower than that of the sheath composition), the sheath may not surround the core in the filament. The filament can then have exposed core regions and the filament may adhere to itself. Additionally, if the melt viscosity of the sheath core composition is significantly higher than the core composition, during melt blending of the core composition and the sheath composition during dispensing, the non-tacky sheath may remain exposed (not blended sufficiently with the core) and adversely impact formation of an adhesive bond with the substrate. The melt viscosities of the sheath composition to the melt viscosity of the core composition is in a range of 100:1 to 1:100, in a range of 50:1 to 1:50, in a range of 20:1 to 1:20, in a range of 10:1 to 1:10, or in a range of 5:1 to 1:5. In many embodiments, the melt viscosity of the sheath composition is greater than that of the core composition. In such situations, the viscosity of the sheath composition to the core composition is typically in a range of 100:1 to 1:1, in a range of 50:1 to 1:1, in a range of 20:1 to 1:1, in a range of 10:1 to 1:1, or in a range of 5:1 to 1:1.

In addition to exhibiting strength, the sheath material is non-tacky. A material is non-tacky if it passes a "Self-Adhesion Test", in which the force required to peel the material apart from itself is at or less than a predetermining maximum threshold amount, without fracturing the material. Employing a non-tacky sheath allows the filament to be handled and optionally printed, without undesirably adhering to anything prior to deposition onto a substrate.

In certain embodiments, the sheath material exhibits a combination of at least two of low MFI (e.g., less than or equal to 15 grams/10 minutes), moderate elongation at break (e.g., 100% or more as determined by ASTM D638-14 using test specimen Type IV), low tensile stress at break (e.g., 10 MPa or more as determined by ASTM D638-14 using test specimen Type IV), and moderate Shore D hardness (e.g., 30-70 as determined by ASTM D2240-15). A sheath having at least two of these properties tends to have the toughness suitable for use in FFF-type applications.

In some embodiments, to achieve the goals of providing structural integrity and a non-tacky surface, the sheath comprises a material selected from styrenic copolymers (e.g., styrenic block copolymers such as styrene-butadiene block copolymers), polyolefins (e.g., polyethylene, polypropylene, and copolymers thereof), ethylene vinyl acetates, polyurethanes, ethylene methyl acrylate copolymers, ethylene (meth)acrylic acid copolymers, nylon, (meth)acrylic block copolymers, poly(lactic acid), anhydride modified ethylene acrylate resins, and the like. Depending on the method of making the core-sheath filament, it may be advantageous to at least somewhat match the polarity of the sheath polymeric material with that of the polymer in the core.

Suitable styrenic materials for use in the sheath are commercially available and include, for example and without limitation, styrenic materials under the trade designation KRATON (e.g., KRATON D116 P, D1118, D1119, and A1535) from Kraton Performance Polymers (Houston, Tex., USA), under the trade designation SOLPRENE (e.g., SOLPRENE S-1205) from Dynasol (Houston, Tex., USA), under the trade designation QUINTAC from Zeon Chemicals (Louisville, Ky., USA), under the trade designations VECTOR and TAIPOL from TSRC Corporation (New Orleans, La., USA), and under the trade designations K-RESIN (e.g., K-RESIN DK11) from Ineos Styrolution (Aurora, Ill., USA).

Suitable polyolefins are not particularly limited. Suitable polyolefin resins include for example and without limitation, polypropylene (e.g., a polypropylene homopolymer, a polypropylene copolymer, and/or blends comprising polypropylene), polyethylene (e.g., a polyethylene homopolymer, a polyethylene copolymer, high density polyethylene ("HDPE"), medium density polyethylene ("MDPE"), low density polyethylene ("LDPE"), and combinations thereof. For instance, suitable commercially available LDPE resins include PETROTHENE NA217000 available from LyondellBasell (Rotterdam, Netherlands) with a MFI of 5.6 grams/10 minutes, MARLEX 1122 available from Chevron Phillips (The Woodlands, Tex.) Suitable HDPE resins include ELITE 5960G from Dow Chemical Company (Midland, Mich., USA) and HDPE HD 6706 series from ExxonMobil (Houston, Tex., USA). Polyolefin block copolymers are available from Dow Chemical under the trade designation INFUSE (e.g., INFUSE 9807).

Suitable commercially available thermoplastic polyurethanes include for instance and without limitation, ESTANE 58213 and ESTANE ALR 87A available from the Lubrizol Corporation (Wickliffe, Ohio)

Suitable ethylene vinyl acetate ("EVA") polymers (i.e., copolymers of ethylene with vinyl acetate) for use in the sheath include resins from Dow, Inc. (Midland, Mich.) available under the trade designation ELVAX. Typical grades range in vinyl acetate content from 9 to 40 weight percent and a melt flow index of as low as 0.3 grams per 10 minutes. (per ASTM D1238). One exemplary material is ELVAX 3135 SB with a MFI of 0.4 grams per 10 minutes. Suitable EVAs also include high vinyl acetate ethylene copolymers from LyondellBasell (Houston, Tex.) available under the trade designation ULTRATHENE. Typical grades range in vinyl acetate content from 12 to 18 weight percent. Suitable EVAs also include EVA copolymers from Celanese Corporation (Dallas, Tex.) available under the trade designation ATEVA. Typical grades range in vinyl acetate content from 2 to 26 weight percent.

Suitable nylon materials for use in the sheath include a nylon terpolymeric material from Nylon Corporation of America under the trade designation NYCOA CAX.

Suitable poly(ethylene methyl acrylate) for use in the sheath include resins from Dow Inc. (Midland, Mich., USA) under the trade designation ELVALOY (e.g., ELVALOY 1330 with 30 percent methyl acrylate and a MFI of 3.0 grams/10 minutes, ELVALOY 1224 with 24 percent methyl acrylate and a MFI of 2.0 grams/10 minutes, and ELVALOY 1609 with 9 percent methyl acrylate and a MFI of 6.0 grams/10 minutes).

Suitable anhydride modified ethylene acrylate resins are available from Dow under the trade designation BYNEL such as BYNEL 21E533 with a MFI of 7.3 grams/10 minutes and BYNEL 30E753 with a MFI of 2.1 grams/10 minutes.

Suitable ethylene (meth)acrylic copolymers for use in the sheath include resins from Dow, Inc. under the trade designation NUCREL (e.g., NUCREL 925 with a MFI of 25.0 grams/10 minutes and NUCREL 3990 with a MFI of 10.0 grams/10 minutes).

Suitable (meth)acrylic block copolymers for use in the sheath include block copolymers from Kuraray (Chiyoda-ku, Tokyo, JP) under the trade designation KURARITY (e.g., KURARITY LA2250 and KURAITY LA4285). KURARITY LA2250, which has a MFI of 22.7 grams/10 minutes, is an ABA block copolymer with poly(methyl methacrylate) as the A blocks and poly(n-butyl acrylate) as the B block. About 30 weight percent of this polymer is poly(methyl methacrylate). KURAITY LA4285, which has a MFI of 1.8 grams/10 minutes, is an ABA block copolymer with poly(methyl methacrylate) as the A blocks and poly(n-butyl acrylate as the B block. About 50 weight percent of this polymer is poly(methyl methacrylate). Varying the amount of poly(methyl methacrylate) in the block copolymer alters its glass transition temperature and its toughness.

Suitable poly(lactic acid) for use in the sheath include those available from Natureworks, LLC (Minnetonka, N. Mex., USA) under the trade designation INGEO (e.g., INGEO 6202D Fiber grade).

The sheath typically makes up 1 to 10 weight percent of the total weight of the core-sheath filament. The amount can be at least 1 weight percent, at least 2 weight percent, at least 3 weight percent, at last 4 weight percent, at least 5 weight percent and up to 10 weight percent, up to 9 weight percent, up to 8 weight percent, up to 7 weight percent, up to 6 weight percent, or up to 5 weight percent.

Core

Cores of the present disclosure may be prepared by processes known to those of ordinary skill in the relevant arts and typically consist essentially of: 1) 33 to 94.8 weight percent of a hot-melt processable adhesive; 2) 0.0002 to 2 weight percent of a transition metal compound; 3) 0.1 to 5 weight percent of an accelerator; and 4) 5 to 60 weight percent of a curable composition based on a total weight of the core.

Hot-Melt Processable Adhesive

Hot-melt processable adhesives useful in embodiments of the present disclosure are known in the art and are described, for example, in U.S. Pub. No. 2013/0184394 (Satrijo et al.), U.S. Pub. No. 2009/0286950 (Schumann et al.), and U.S. Pub. No. 2018/0215959 (Liu et al.), Suitable hot-melt processable adhesives are not particularly limited and may be prepared by methods known to those of ordinary skill in the relevant arts. Suitable hot-melt processable adhesives may include hot-melt processable adhesives comprising, for example, acrylic polymers, rubber polymers, polyester polymers, polyurethane polymers, polyamide polymers, and combinations thereof.

In some embodiments, hot-melt processable adhesives of the present disclosure may include polymers derived from (meth)acrylates. In some embodiments, hot-melt processable adhesives of the present disclosure may include polymers derived from secondary alkyl (meth)acrylates, such as those disclosed in U.S. Pat. No. 9,102,774.

Transition Metal Compound

The transition metals are those metals that have their valence electrons in a "d" subshell. Included in this group are the metals of Groups 3, 4, 5, 6, 7, 8, 9, 10 and 11 of the Periodic Table of Elements. Particularly useful transition metals in embodiments of the present disclosure include copper, molybdenum, titanium, vanadium, chromium, manganese, iron, cobalt, nickel, and zinc. Alloys of these transition metals with minor amounts of other metals also can be utilized.

The transition metal compound may be in the form of an inorganic or organometallic compound, including oxides, salts, and organometallic chelates and complexes. Suitable organic salts include the sulfates, nitrates, chlorides, bromides, phosphates and sulfides. Suitable organic salts include the alkoxides, for example, the methoxides and ethoxides, as well as the carboxylates, including the acetates, hexoates, octoates, ethylhexanoates, and naphthenlates. Other suitable transition metal complexes include the acetylacetonates and the hexafluoroacetylacetonates. Particularly useful transition metal compounds include copper 2-ethylhexanoate, copper acetate, copper naphthenate, copper octoate, copper hexanoate, and copper hexafluoroacetylacetonate.

Accelerator

The core additionally comprises an accelerator. The accelerator functions as a component of a redox couple for radical initiation of acrylic polymerizations in solvent.

In some embodiments, the accelerator may be an onium salt such as, for example a phosphonium salt or a quaternary ammonium salt. In some embodiments, the quaternary ammonium salt may be benzyltriethylammonium chloride, available commercially from Sigma Aldrich, St. Louis, Mo.

In other embodiments the accelerator may be chosen from organic or inorganic chloride ion containing compounds such as, for example, amine hydrochlorides or sodium chloride.

Curable Composition

The curable composition can provide shear adhesion properties to the core when included at lower levels, e.g., 5 to 20 weight percent of a curable composition based on a total weight of the core, or can provide structural adhesive properties to the core when included at higher levels, e.g. 30 to 60 weight percent of a curable composition based on a total weight of the core.

Curable compositions useful in embodiments of the present disclosure are commonly a reactive species comprising unsaturated, free-radically polymerizable groups. In some embodiments, the unsaturated free-radically polymerizable groups are selected from vinyl-containing groups such as (meth)acrylate groups. In some embodiments the curable adhesive film additionally comprises a crosslinker comprising two or more or three or more unsaturated free-radically polymerizable groups, such as vinyl-containing groups or (meth)acrylate groups. In some embodiments, the crosslinker is a crosslinking monomer. In some embodiments, the crosslinker is an oligomer.

In some embodiments, the curable composition may comprise crosslinking agents such as, for example, crosslinking agents disclosed in U.S. Pub. No. 2018/0029970 (Liu et al.)

In some preferred embodiments, the curable composition may include a polyfunctional acrylate such as, for example, ditrimethylolpropane tetraacrylate, available commercially under the trade designation MIRAMER M410 from Miwon Specialty Chemical Co., Ltd., Exton, Pa.

Primer

The present disclosure provides primers capable of initiating cure of the core. In some embodiments, the primers comprise an oxidizing agent; and optionally a transition metal cation. The primer is generally a liquid at normal temperature and pressure.

Oxidizing Agent

Suitable oxidizing agents may include organic peroxides, inorganic peroxides, or persulfates. Suitable organic peroxides may include hydroperoxides, ketone peroxides, diacyl peroxides, dialkyl peroxides, peroxyketals, peroxyesters, and peroxydicarbonates.

Suitable organic peroxides may include di-peroxides, which may include di-peroxides comprising the moiety $R^1$—O—O—$R^2$—O—O—$R^3$, with $R^1$ and $R^3$ being independently selected from H, alkyl (e.g. C1 to C6), branched alkyl (e.g. C1 to C6), cycloalkyl (e.g. C5 to C10), alkylaryl (e.g. C7 to C12) or aryl (e.g. C6 to C10) and $R^2$ being selected from alkyl (e.g. (C1 to C6) or branched alkyl (e.g. C1 to C6).

Suitable ketone peroxides may include methyl ethyl ketone peroxide, methyl isobutyl ketone peroxide, methyl cyclohexanone peroxide, and cyclohexanone peroxide. Suitable peroxyesters may include alpha-cumylperoxyneodecanoate, t-butyl peroxypivarate, t-butyl peroxyneodecanoate, 2,2,4-trimethylpentylperoxy-2-ethyl hexanoate, t-amylperoxy-2-ethyl hexanoate, t-butylperoxy-2-ethyl hexanoate, di-t-butylperoxy isophthalate, di-t-butyl peroxy hexahydroterephthalate, t-butylperoxy-3,3,5-trimethylhexanoate, t-butylperoxy acetate, t-butylperoxy benzoate and t-butylperoxymaleic acid.

Suitable peroxidicarbonates may include di-3-methoxy peroxidicarbonate, di-2-ethylhexyl peroxy-dicarbonate, bis(4-t-butylcyclohexyl)peroxidicarbonate, diisopropyl-1-peroxydicarbonate, di-n-propyl peroxidicarbonate, di-2-ethoxyethyl-peroxidicarbonate, and diallyl peroxidicarbonate.

Suitable diacyl peroxides may include acetyl peroxide, benzoyl peroxide, decanoyl peroxide, 3,3,5-trimethylhexanoyl peroxide, 2,4-dichlorobenzoyl peroxide and lauroylperoxide. Suitable dialkyl peroxides may include di-t-butyl peroxide, dicumylperoxide, t-butylcumyl peroxide, 2,5-dimethyl-2,5-di(t-butylperpoxy)hexane, 1,3-bis(t-butylperoxyisopropyl)benzene and 2,5-dimethyl-2,5-di(t-butylperoxy)-3-hexane Suitable peroxyketals may include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane and 4,4-bis(t-butylperoxy)valeric acid-n-butylester.

In some embodiments, the organic peroxide is a hydroperoxide, in particular a hydroperoxide comprising the structural moiety R—O—O—H with R being (e.g. C1 to C20) alkyl, (e.g. C3 to C20) branched alkyl, (e.g. C6 to C12) cycloalkyl, (e.g. C7 to C20) alkylaryl or (e.g. C6 to C12) aryl. Suitable organic hydroperoxides may include t-butyl hydroperoxide, t-amyl hydroperoxide, p-diisopropylbenzene hydroperoxide, cumene hydroperoxide, pinane hydroperoxide, p-methane hydroperoxide and 1,1,3,3-tetramethylbutyl hydroperoxide. Suitable oxidizing agents may include peroxodisulfate components and/or peroxodiphosphate components. Suitable examples may include ammonium, sodium, and potassium peroxodisulfate components and/or peroxodiphosphate components Suitable organic peroxides may additionally include t-butyl peroxy ethylhexyl carbonate, t-butyl peroxy trimethylhexanoate, t-butyl peroxy ethylhexanoate, t-amyl peroxy ethylhexanoate, t-octyl peroxy ethylhexanoate, t-amyl peroxy ethylhexyl carbonate, t-butyl peroxy isopropyl carbonate, t-butyl peroxyneodecanoate, t-butyl peroxyisobutyrate, or t-butyl hydroperoxide.

In some embodiments, the primer comprises at least 5 weight percent, at least 10 weight percent, at least 20 weight percent, or at least 30 weight percent of the oxidizing agent. In some embodiments, the primer comprises no more than 50 weight percent, no more than 40 weight percent, no more than 30 weight percent, or no more than 20 weight percent of the oxidizing agent.

The primer can be applied to a substrate in any desired thickness. In some embodiments, the primer coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), no greater than 2 mils (50 micrometers), or no greater than 1 mil (25 micrometers). The primer coating thickness is often at least 0.0039 mils (0.1 micrometers), at least 0.098 mils (2.5 micrometers), at least 0.197 mils (5 micrometers), at least 0.5 mils (12.5 micrometers) or at least 1 mil (25 micrometers). For example, the thickness of the primer coating can be in the range of 0.5 mils (12.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

Transition Metal Cation

In some embodiments, the transition metal cation is a cation of molybdenum, titanium, vanadium, chromium, manganese, iron, cobalt, nickel, copper or zinc. In some embodiments, the transition metal cation is a copper cation, such as Cu(II). In some embodiments, the transition metal cation is an iron cation, such as Fe(II) or Fe(III), such as may be found in Black 11 ($Fe_3O_4$ or $FeO.Fe_2O_3$), Red 102 ($Fe_2O_3$), or Yellow 42 ($FeO(OH).H_2O$).

In some embodiments, the primer additionally comprises a crosslinker comprising two or more or three or more unsaturated free-radically polymerizable groups, such as vinyl-containing groups, such as (meth)acrylate groups.

In some preferred embodiments, the primer may comprise a mixture of 3M VHB UNIVERSAL PRIMER UV (3M Company, St. Paul, Minn.) and tert-butylperoxy 2-ethylhexyl carbonate, available under the trade designation LUPEROX TBEC (Arkema Inc., King of Prussia, Pa.).

In some embodiments, the primer may additionally contain excipients to facilitate transport of oxidizing agents. In some embodiments, common plasticizers may be used as excipients. In some embodiments, plasticizers such as low vapor pressure (at room temperature) plasticizers and/or high boiling point plasticizers may be used. In some embodiments, the primer comprises no tackifier.

In some embodiments the primer may additionally comprise fillers, such as solid or hollow particles comprising polymer, glass, ceramic, metal or metal oxide materials, and combinations thereof.

Method of Printing

A method of printing a hot-melt processable adhesive is provided. The method includes forming a core-sheath filament as described above. The method further includes melting the core-sheath filament and blending the sheath with the core to form a molten composition. The method still further includes dispensing the molten composition through a nozzle onto a substrate. The molten composition can be formed before reaching the nozzle, can be formed by mixing in the nozzle, or can be formed during dispensing through the nozzle, or a combination thereof. Preferably, the sheath composition is uniformly blended throughout the core composition.

Fused filament fabrication ("FFF"), which is also known under the trade designation "FUSED DEPOSITION MODELING" from Stratasys, Inc., Eden Prairie, Minn., is a process that uses a thermoplastic strand fed through a hot can to produce a molten aliquot of material from an extrusion head. The extrusion head extrudes a bead of material in 3D space as called for by a plan or drawing (e.g., a computer aided drawing ("CAD") file). The extrusion head typically lays down material in layers, and after the material is deposited, it fuses.

One suitable method for printing a core-sheath filament comprising an adhesive onto a substrate is a continuous non-pumped filament fed dispensing unit. In such a method, the dispensing throughput is regulated by a linear feed rate of the core-sheath filament allowed into the dispense head. In most currently commercially available FFF dispensing heads, an unheated filament is mechanically pushed into a heated zone, which provides sufficient force to push the filament out of a nozzle. A variation of this approach is to incorporate a conveying screw in the heated zone, which acts to pull in a filament from a spool and also to create pressure to dispense the material through a nozzle. Although addition of the conveying screw into the dispense head adds cost and complexity, it does allow for increased throughput, as well as the opportunity for a desired level of component mixing and/or blending. A characteristic of filament fed dispensing is that it is a true continuous method, with only a short segment of filament in the dispense head at any given point.

There can be several benefits to filament fed dispensing methods compared to traditional hot-melt adhesive deposition methods. First, filament fed dispensing methods typically permits quicker changeover to different adhesives. Also, these methods do not use a semi-batch mode with melting tanks and this minimizes the opportunity for thermal degradation of an adhesive and associated defects in the deposited adhesive. Filament fed dispensing methods can use materials with higher melt viscosity, which affords an adhesive bead that can be deposited with greater geometric precision and stability without requiring a separate curing or crosslinking step. In addition, higher molecular weight raw materials can be used within the adhesive because of the higher allowable melt viscosity. This is advantageous because uncured hot-melt pressure sensitive adhesives containing higher molecular weight raw materials can have significantly improved high temperature holding power while maintaining stress dissipation capabilities.

The form factor for FFF filaments is usually a concern. For instance, consistent cross-sectional shape and longest cross-sectional distance (e.g., diameter) assist in cross-compatibility of the core-sheath filaments with existing standardized FFF filaments such as ABS or polylactic acid ("PLA"). In addition, consistent longest cross-section distance (e.g., diameter) helps to ensure the proper throughput of adhesive because the FFF dispense rate is generally determined by the feed rate of the linear length of a filament. Suitable longest cross-sectional distance variation of the core-sheath filament according to at least certain embodiments when used in FFF includes a maximum variation of 20 percent over a length of 50 cm, or even a maximum variation of 15 percent over a length of 50 cm.

Extrusion-based layered deposition systems (e.g., fused filament fabrication systems) are useful for making articles including printed adhesives in methods of the present disclosure. Deposition systems having various extrusion types of are commercially available, including single screw extruders, twin screw extruders, hot-end extruders (e.g., for filament feed systems), and direct drive hot-end extruders (e.g., for elastomeric filament feed systems). The deposition systems can also have different motion types for the deposition of a material, including using XYZ stages, gantry cranes, and robot arms. Common manufacturers of additive manufacturing deposition systems include Stratasys, Ultimaker, MakerBot, Airwolf, WASP, MarkForged, Prusa, Lulzbot, BigRep, Cosin Additive, and Cincinnati Incorporated. Suitable commercially available deposition systems include for instance and without limitation, BAAM, with a pellet fed screw extruder and a gantry style motion type, available from Cincinnati Incorporated (Harrison, Ohio); BETABRAM Model P1, with a pressurized paste extruder and a gantry style motion type, available from Interelab d.o.o. (Senovo, Slovenia); AM1, with either a pellet fed screw extruder or a gear driven filament extruder as well as a XYZ stages motion type, available from Cosine Additive Inc. (Houston, Tex.); KUKA robots, with robot arm motion type, available from KUKA (Sterling Heights, Mich.); and AXIOM, with a gear driven filament extruder and XYZ stages motion type, available from AirWolf 3D (Fountain Valley, Calif.).

Three-dimensional articles including a printed adhesive can be made, for example, from computer-aided drafting ("CAD") models in a layer-by-layer manner by extruding a molten adhesive onto a substrate. Movement of the extrusion head with respect to the substrate onto which the adhesive is extruded is performed under computer control, in accordance with build data that represents the final article. The build data is obtained by initially slicing the CAD model of a three-dimensional article into multiple horizontally sliced layers. Then, for each sliced layer, the host computer generates a build path for depositing roads of the composition to form the three-dimensional article having a printed adhesive thereon. In select embodiments, the printed adhesive comprises at least one groove formed on a surface of the printed adhesive. Optionally, the printed adhesive forms a discontinuous pattern on the substrate.

The substrate onto which the molten adhesive is deposited is not particularly limited. In many embodiments, the substrate comprises a polymeric part, a glass part, or a metal part. Use of additive manufacturing to print an adhesive on a substrate may be especially advantageous when the substrate has a non-planar surface, for instance a substrate having an irregular or complex surface topography. Before depositing molten adhesive to the surface of the substrate, the substrate is treated with one or more primers, as described above. The primer is typically applied as a solvent-borne liquid, by any suitable method, which may include, for example, brushing, spraying, dipping, and the like. In some embodiments, the substrate surface may be treated with one or more organic solvents (e.g., methyl ethyl ketone, aqueous isopropanol solution, acetone) prior to application of the primer.

The core-sheath filament can be extruded through a nozzle carried by an extrusion head and deposited as a sequence of roads on a substrate in an x-y plane. The extruded molten adhesive fuses to previously deposited molten adhesive as it solidifies upon a drop-in temperature. This can provide at least a portion of the printed adhesive. The position of the extrusion head relative to the substrate is then incremented along a z-axis (perpendicular to the x-y plane), and the process is repeated to form at least a second layer of the molten adhesive on at least a portion of the first layer. Changing the position of the extrusion head relative to the deposited layers may be carried out, for example, by lowering the substrate onto which the layers are deposited. The process can be repeated as many times as necessary to form a three-dimensional article including a printed adhesive resembling the CAD model. Further details can be found, for example, Turner, B. N. et al., "A review of melt extrusion additive manufacturing processes: I. process design and modeling"; Rapid Prototyping Journal 20/3 (2014) 192-204. In certain embodiments, the printed adhesive comprises an integral shape that varies in thickness in an axis normal to the substrate. This is particularly advantageous in instances where a shape of adhesive is desired that cannot be formed using die cutting of an adhesive.

A variety of fused filament fabrication 3D printers may be useful for carrying out the method according to the present disclosure. Many of these are commercially available under the trade designation "FDM" from Stratasys, Inc., Eden Prairie, Minn., and subsidiaries thereof. Desktop 3D printers for idea and design development and larger printers for direct digital manufacturing can be obtained from Stratasys and its subsidiaries, for example, under the trade designations "MAKERBOT REPLICATOR", "UPRINT", "MOJO", "DIMENSION", and "FORTUS". Other 3D printers for fused filament fabrication are commercially available from, for example, 3D Systems, Rock Hill, S.C., and Airwolf 3D, Costa Mesa, Calif.

In certain embodiments, the method further comprises mixing the molten composition (e.g., mechanically) prior to dispensing the molten composition. In other embodiments, the process of being melted in and dispensed through the nozzle may provide sufficient mixing of the composition such that the molten composition is mixed in the nozzle, during dispensing through the nozzle, or both.

The temperature of the substrate onto which the adhesive can be deposited may also be adjusted to promote the fusing of the deposited adhesive. In the method according to the present disclosure, the temperature of the substrate may be, for example, at least about 100° C., 110° C., 120° C., 130° C., or 140° C. up to 175° C. or 150° C.

The printed adhesive prepared by the method according to the present disclosure may be an article useful in a variety of industries, for example, the aerospace, apparel, architecture, automotive, business machines products, consumer, defense, dental, electronics, educational institutions, heavy equipment, jewelry, medical, and toys industries. The composition of the sheath and the core can be selected so that, if desired, the printed adhesive is clear.

SELECT EMBODIMENTS OF THE PRESENT DISCLOSURE

In a first embodiment is provided an adhesive system comprising:
I) core-sheath filament comprising:
   a non-tacky sheath, wherein the sheath exhibits a melt flow index of less than 15 grams per 10 minutes; and
   a hot-melt processable adhesive core, wherein the hot-melt processable adhesive core comprises a blend of:
      a hot-melt processable adhesive;
      a transition metal compound;
      an accelerator; and
      a curable component; and
II) a primer for adhesion of the core-sheath filament to a substrate comprising: an oxidizing agent,
wherein the primer is a liquid at normal temperature and pressure.

In a second embodiment provided is the adhesive system of the first embodiment, wherein the non-tacky sheath comprises low density polyethylene.

In a third embodiment provided is the adhesive system of the first embodiment or the second embodiment, wherein the hot-melt processable adhesive comprises an acrylate monomer.

In a fourth embodiment provided is the adhesive system of any one of the first through the third embodiments, wherein the transition metal compound includes a cation of a metal selected from the group consisting of molybdenum, titanium, vanadium, chromium, manganese, iron, cobalt, nickel, copper, zinc, and combinations thereof In a fifth embodiment provided is the adhesive system of any one of the first through the fourth embodiments, wherein the accelerator is a quaternary ammonium salt.

In a sixth embodiment provided is the adhesive system of any one of the first through the fifth embodiments, wherein the curable component is a polyfunctional acrylate.

In a seventh embodiment provided is the adhesive system of any one of the first through the sixth embodiments, wherein the oxidizing agent is an organic peroxide.

In an eighth embodiment provided is the adhesive system of any one of the first through the seventh embodiments, wherein the primer comprises no tackifier.

In a ninth embodiment provided is the adhesive system of any one of the first through the eighth embodiments, wherein the primer comprises no species comprising unsaturated free-radically polymerizable groups.

In a tenth embodiment provided is the adhesive system of any one of the first through the ninth embodiments, wherein the core-sheath filament comprises 1 to 10 weight percent sheath and 90 to 99 weight percent hot-melt processable adhesive core based on a total weight of the core-sheath filament.

In an eleventh embodiment provided is a method of making a core-sheath filament, the method comprising:
  a) forming a core composition that is hot-melt processable adhesive comprising
    1) 33 to 94.8 weight percent of a random copolymer based on a total weight of the core, the random copolymer comprising an acrylate monomer;
    2) 0.0002 to 2 weight percent of a transition metal compound based on the total weight of the core;
    3) 0.1 to 5 weight percent of an accelerator based on the total weight of the core;
    4) 5 to 60 weight percent of a curable composition based on the total weight of the core;
  b) forming a sheath composition comprising a non-tacky thermoplastic material; and
  c) wrapping the sheath composition around the core composition the core-sheath filament, wherein the core-sheath filament has an average longest cross-sectional distance in a range of 1 to 20 millimeters.

In a twelfth embodiment provided is the method of the eleventh embodiment, wherein the wrapping the sheath composition around the core composition comprises co-extruding the core composition and the sheath composition such that the sheath composition surrounds the core composition.

In a thirteenth embodiment provided is a method of printing a hot-melt processable adhesive, the method comprising:
  a) forming a core-sheath filament according to the method of the eleventh embodiment or the twelfth embodiment;
  b) melting and mixing the core-sheath filament to form a molten composition; and
  c) dispensing the molten composition through a nozzle onto a substrate, wherein the substrate has been treated with a primer.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., or may be synthesized by known methods. The following abbreviations are used in this section: g=gram, mg=milligram, kg=kilogram, m=meter, centimeter=cm, mm=millimeter, ° C.=degrees Celsius, ° F.=degrees Fahrenheit, MPa=mega Pascal, rpm=revolutions per minute, phr=parts per hundred, psi=pounds per square inch, lb=pound.

Table 1 (below) lists materials used in the examples and their sources.

TABLE 1

Materials List

| DESIGNATION | DESCRIPTION |
|---|---|
| PE1 | A compound prepared as described in Preparatory Example 1 |
| M1 | A compound prepared as described in Example1 of U.S. Pat. No. 9,102,774. |
| AA | Acrylic acid, obtained from Sigma Aldrich, St. Louis, MO |
| IBOA | Isobornyl acrylate, obtained from Sigma Aldrich, St. Louis, MO |
| Photoinitiator-1 | 2,2-dimethoxy-1,2-diphenylethan-1-one, obtained under the trade designation "IRGACURE 651" from BASF Corporation, Florham Park, NJ |
| M2 | A compound prepared as described in Example 1 of U.S. Pat. Pub. No. 20180029970 |
| Antioxidant-1 | Octadecyl-[3-(3,5-di-tert-butyl-4-hydroxyphenyl)propionate], obtained under the trade designation "IRGANOX 1076" from BASF Corporation, Florham Park, NJ |
| IOTG | Isooctyl thioglycolate, obtained from TCI America. Portland, OR |
| TBEC | Tert-Butylperoxy 2-ethylhexyl carbonate, obtained under the trade designation "LUPEROX TBEC" from Arkema Inc., King of Prussia, PA. |
| BTEAC | Benzyltriethylammonium chloride, obtained from Sigma Aldrich, St. Louis, MO. |
| M410 | Ditrimethylolpropane tetraacrylate, obtained under the trade designation "MIRAMER M410" from Miwon Specialty Chemical Co., Ltd., Exton, PA. |
| PE2 | Dispersion of copper salt prepared as described in Preparatory Example 2 |
| PE3 | A film of polyethylene prepared as described in Preparatory Example 3 |
| Cu2EHA | Copper (II) 2-ethylhexanoate, obtained from Thermo Fisher Scientific Chemicals, Inc., Ward Hill, MA |
| LDPE | Low density polyethylene, obtained under the trade designation "PETROTHENE NA217000" from LyondellBasell, Houston, TX |
| UPUV | A primer for pressure sensitive adhesives, obtained under the trade designation "3M VHB UNIVERSAL PRIMER UV" from 3M Company, St. Paul, MN |
| MEK | Methyl ethyl ketone, obtained from Avantor Performance Materials, Center Valley, PA |
| IPA | Isopropyl alcohol, obtained from Sigma Aldrich, St. Louis, MO |
| ACE | Acetone, obtained from Sigma Aldrich, St. Louis, MO |

PREPARATORY EXAMPLES

Preparation of PE1

This material was prepared as described in Synthesis Example S1 of US20130184394 except that the composition was as follows: 85 parts M1, 5 parts AA, 10 parts IBOA, 0.15 phr of Photoinitiator-1, 0.155 phr M2, 0.4 phr Antioxidant-1, and 0.035 phr IOTG. Materials and amounts used are shown in Table 2.

TABLE 2

PE1 Formulation

| Material | Mass (g) | Wt % Composition Polymer |
|---|---|---|
| M1 | 84.36 | 84.36% |
| IBOA | 9.93 | 9.93% |

TABLE 2-continued

PE1 Formulation

| Material | Mass (g) | Wt % Composition Polymer |
|---|---|---|
| AA | 4.96 | 4.96% |
| M2 | 0.15 | 0.15% |
| Photoinitiator-1 | 0.15 | 0.15% |
| IOTG | 0.05 | 0.05% |
| Antioxidant-1 | 0.40 | 0.40% |

Preparation of PE2

Charged to an 8-ounce glass jar was 3.6 g of Cu2EHA and 100.0 g M410. Sample was mixed using a MUD1001AN high-speed disperser (Carter Motor Company, Warren, Ill.) with 2-inch Cowles blade until visually uniform. The dispersed mixture was then milled using a Model 27250 3-Roll mill (Netzsch Inc, Exton Pa.) controlling the roll gaps and rate so that a uniform flow was obtained. Material was milled three times and not further characterized. Materials and amounts used are shown in Table 3.

TABLE 3

PE2 Formulation

| Material | Mass (g) | Wt % Composition Mixture |
|---|---|---|
| M410 | 100.0 | 96.53% |
| Cu2EHA | 3.6 | 3.47% |

Preparation of PE3

Films of non-tacky sheaths were prepared by hot-melt pressing pellets of LDPE to average thickness of 5-7 mils (0.127-0.178 mm) in a Model 4389 hot press (Carver, Inc., Wabash, Ind.) at 140° C. (284° F.). Rectangles of film 1.5 inch (3.77 cm) in width and 2.7-5.9 inch (7-15 cm) in length were cut and used in the examples as described below.

Preparation of Core/Sheath Curable Adhesive 1 (CAF1)

The batch preparation of core-sheath filament adhesives was carried out using a Plasti-corder EPL-V3302 (C. W. Brabender, Hackensack, N.J.)) equipped with an electrically heated three-part mixer with a capacity of approximately 250 cm³ and high shear counter-rotating blades. The mixer was preheated to 125° C. (257° F.) and set at a mixing speed of 60 rpm. 135.21 g PE1 was added to the chamber and allowed to mix for two minutes before 7.16 g BTEAC and 4.81 g PE2 was added. Then the mixture was mixed an additional 5 minutes before adding 2.87 g M410 and mixed a final 10 minutes. The system was cooled to 80° C. (176° F.) under a mixing speed of 30 rpm for adhesive removal from the chamber. A core/sheath filament was made by hand rolling the adhesive with PE3 to yield a core/sheath filament 0.47 inch (12 mm) in diameter and enough sample to equal 16.54 inch (42 cm) of length. 16.54 inch (42 cm) of core/sheath filament was then added directly to the top of the mixing chamber totaling about 50 g and mixed at 60 rpm, 150° C. (302° F.) for 10 minutes, at which time the mixture appeared homogeneous. After removal from the mixer, a hot press was used to press a portion of the material to a 5 mil thickness between silicone coated release liners.

Preparation of Core/Sheath Curable Adhesive 2 (CAF2)

CAF2 was made the same as CAF1, except that material charges were as follows: 113.86 g PE1, 6.02 g BTEAC, 4.06 g PE2, and 26.13 g M410.

Preparation of Core/Sheath Curable Adhesive 3 (CAF3)

CAF3 was made the same as CAF1, except that material charges were as follows: 85.38 g PE1, 4.56 g BTEAC, 3.05 g PE2, and 57.08 g M410.

Preparation of Primer 1 (P1)

Solution of P1 was made by adding 0.8 g TBEC to 20.0 g UPUV.

Test Methods

Dynamic Shear Test Specimen Preparation

Aluminum substrates 1 inch by 4 inch by 0.064 inch (2.5 cm by 10 cm by 1.6 mm) were washed with MEK, then 50/50 water/IPA solution, and then three times with acetone, followed by air-drying. The substrates were then primed with P1 above. Priming was done by folding a small lab wipe three times to make about a one-inch strip which was dipped into the primer solution and wiped from the end of the substrate to the middle so that about two inches was coated. Primed substrates were allowed to air dry a minimum of two minutes before adhesive application. Specimens were made by cutting a 1-inch (2.5 cm) strip of adhesive described in Preparatory Examples—Core/Sheath Curable Adhesives 1-3 (CAF1-CAF3). One liner was removed, and adhesive laid across the primed portion of the substrate. A 4.5 lb (2.04 kg) hand roller was used to apply pressure to the adhesive rolling back and forth three times. Bonds were formed by removing the top release liner exposing the adhesive and introducing it to a second primed substrate. Closed bonds were then rolled down in a ChemInstruments auto roller (ChemInstruments, Fairfield, Ohio) three times back and forth at 24 inch/minute with a 15 lb (6.80 kg) roller. The bonded test assembly was dwelled at room temperature for 24 hours prior to testing.

Dynamic Shear Test

A dynamic overlap shear test was performed at ambient temperature using an Insight 30EL load frame (MTS, Eden Prairie, Minn.). Test specimens were loaded into the grips and the crosshead was operated at 0.1 inch per minute, loading the specimen to failure. Stress at break was recorded in units of psi using testing methods disclosed in ASTM D1002.

Example 1 (EX1)

Adhesive bonds were made using CAF1 and P1 as described previously and tested for dynamic overlap shear.

Example 2 (EX2)

Adhesive bonds were made as described in Example 1, except using CAF2 and P1.

Example 3 (EX3)

Adhesive bonds were made as described in Example 1, except using CAF3 and P1.

Comparative Example 1 (CE1)

Adhesive bonds were made as described in Example 1, except using CAF1 and UPUV.

Results

Measurements for dynamic shear using the Dynamic Shear Test Method were collected for Examples 1-3 (EX1-EX3) and Comparative Example 1 (CE1) and presented in Table 2 below.

TABLE 4

| | Dynamic Shear Test Results | |
|---|---|---|
| Sample | Average Peak Stress psi (MPa) | Standard Deviation psi (MPa) |
| Example 1 | 81.00 (0.56) | 36.90 (0.25) |
| Example 2 | 318.12 (2.19) | 62.08 (0.43) |
| Example 3 | 438.68 (3.02) | 60.05 (0.41) |
| Comparative Example 1 | 13.03 (0.09) | 0.17 (0.001) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An adhesive system comprising:
   I) core-sheath filament comprising:
      a non-tacky sheath, wherein the sheath exhibits a melt flow index of less than 15 grams per 10 minutes; and
      a hot-melt processable adhesive core, wherein the hot-melt processable adhesive core comprises a blend of:
         a hot-melt processable adhesive;
         a transition metal compound;
         an accelerator; and
         a curable component; and
   II) a primer for adhesion of the core-sheath filament to a substrate comprising:
      an oxidizing agent,
      wherein the primer is a liquid at normal temperature and pressure.

2. The adhesive system of claim 1, wherein the non-tacky sheath comprises low density polyethylene.

3. The adhesive system of any of claim 1, wherein the hot-melt processable adhesive comprises an acrylate monomer.

4. The adhesive system of claim 1, wherein the transition metal compound includes a cation of a metal selected from the group consisting of molybdenum, titanium, vanadium, chromium, manganese, iron, cobalt, nickel, copper, zinc, and combinations thereof.

5. The adhesive system of any of claim 1, wherein the accelerator is a quaternary ammonium salt.

6. The adhesive system of claim 1, wherein the curable component is a polyfunctional acrylate.

7. The adhesive system of claim 1, wherein the oxidizing agent is an organic peroxide.

8. The adhesive system of claim 1, wherein the primer comprises no tackifier.

9. The adhesive system of any of claim 1, wherein the primer comprises no species comprising unsaturated free-radically polymerizable groups.

10. The adhesive system of any of claim 1, wherein the core-sheath filament comprises 1 to 10 weight percent sheath and 90 to 99 weight percent hot-melt processable adhesive core based on a total weight of the core-sheath filament.

* * * * *